United States Patent [19]

Kato

[11] Patent Number: 5,345,561
[45] Date of Patent: Sep. 6, 1994

[54] DISK DRIVE CONTROL SYSTEM USING A DISK CONTROLLER

[75] Inventor: Taiji Kato, Tokyo, Japan

[73] Assignee: NEC Corporation, Tokyo, Japan

[21] Appl. No.: 464,016

[22] Filed: Jan. 12, 1990

[30] Foreign Application Priority Data

Jan. 12, 1989 [JP] Japan ................. 1-6109

[51] Int. Cl.⁵ ........................... G06F 13/12
[52] U.S. Cl. ................. 395/275; 360/73.01; 360/71; 395/425
[58] Field of Search ............. 364/200, 900; 360/73.01, 71; 395/425, 275

[56] References Cited

U.S. PATENT DOCUMENTS

| | | | |
|---|---|---|---|
| 4,398,227 | 8/1983 | Anderson | 360/71 |
| 4,527,233 | 7/1985 | Ambrosius et al. | 364/200 |
| 4,630,190 | 12/1986 | Alaimo et al. | 364/167 |
| 4,644,426 | 2/1987 | Saito | 360/71 |
| 4,660,106 | 4/1987 | Harrison et al. | 360/77 |
| 4,723,223 | 2/1988 | Hanada | 364/900 |
| 4,754,344 | 6/1988 | Shoji et al. | 360/48 |
| 4,777,345 | 10/1988 | Shoji et al. | 360/78.04 |
| 4,825,309 | 4/1989 | Shoji et al. | 360/60 |
| 4,825,403 | 4/1989 | Gershenson | 364/900 |
| 4,849,929 | 7/1989 | Timsit | 364/900 |
| 4,870,514 | 9/1989 | Enami et al. | 360/72.1 |
| 4,918,544 | 4/1990 | Ishizuka et al. | 360/73.03 |
| 4,978,902 | 12/1990 | Hatagami et al. | 318/60 |

OTHER PUBLICATIONS

Andrew S. Tanenbaum: Structured Computer Organization, Englewood Cliffs, N.J. 1984,, pp. 64–91.

Primary Examiner—Dale M. Shaw
Assistant Examiner—Christopher B. Shin
Attorney, Agent, or Firm—Foley & Lardner

[57] ABSTRACT

A disk drive control system using a disk controller enables a host processor system to issue a data read/write command to a disk controller before a disk drive is brought into an access-enable state. Since a pseudo-ready signal is fixed at the active level the host processor system issues the data read/write command to the disk controller. Once the data read/write command has been issued the host processor system can perform processes other than disk control.

9 Claims, 4 Drawing Sheets

DISK DRIVE CONTROL SYSTEM USING A DISK CONTROLLER

BACKGROUND OF THE INVENTION

The present invention relates to a disk drive control system in which a disk controller intervenes between a disk drive and a host processor system to control data transmission.

Disk drives such as hard disk drives and floppy disk drives are employed as peripheral memory devices of microcomputer systems and personal computer systems. A central processing unit (CPU) in the computer system processes data in word or byte units, whereas data are read from or written into the disk drive in bit units. In order to control data transmission between a host processor system and the disk drive, therefore, a disk controller is used. The data transmission between the host processor system and the disk controller is performed in word or byte units and the data transmission between the disk drive and the disk controller is performed in bit units, as known in the art.

In a computer system with a low power consumption, the disk drive is activated only when data read or data write request in issued. More specifically, when the host processor system encounters a data read or write request to the disk drive, it first issues a disk drive initiation command to the disk controller. In response to this command, the disk controller activates the disk drive. A spindle motor in the disk drive thereby starts to rotate. As is well known in the art, the data read/write operation to the disk drive has to be initiated after the rotation of the spindle motor is stabilized, i.e. after the disk drive is brought into an access-enable state. To this end, the disk drive supplies a ready signal to the disk controller informing the disk controller that the disk drive is in the access-enable state. The active level of the ready signal indicates the access-enable state of the disk drive, whereas the inactive level of the ready signal indicates the access-disable state. The disk controller informs the level of the ready signal to the host processor system each time it receives a disk drive state check command from the host processor system. Accordingly, by repeating the issue of the state check command, the host processor system can detect whether or not the disk drive is brought into the access-enable state.

When the disk drive is detected to be in the access-enable state, the host processor system issues a data read/write command to the disk controller. In response to this command, the disk controller searches a sector on a disk medium, from which data are to be read or into which data are to be written. As is well known in the art, the disk drive further supplies an index pulse signal to the disk controller. This index pulse signal represents a physical starting point of each track on the disk medium. If the disk controller does not find a certain sector before a predetermined number of index pulses are supplied thereto, it stops the data read/write operation and informs the host processor system of error occurrence. On the other hand, when the disk controller finds the certain sector, it starts the data read/write operation on that sector in bit units.

Thus, the operation of the host processor system is focussed on the disk control until the rotation speed of the spindle motor is stabilized to bring the disk drive into the access-enable state. A time period required for stabilizing the rotation speed of the spindle motor is very long compared to the instruction execution time of the host processor system. For this reason, the efficiency of program execution by the host processor system is deteriorated remarkably. The host processor system could issue the data read/write command to the disk controller before the rotation speed of the spindle motor is stabilized, i.e. before the ready signal is changed from the inactive level to the active level. In this case, however, since the data read-out rate from the disk drive is not constant, the disk controller cannot search the certain sector before the predetermined number of index pulses are supplied thereto, and error information is supplied to the host processor system.

SUMMARY OF THE INVENTION

Therefore, an object of the present invention is to provide an improved disk drive control system in which a disk controller intervenes between a host processor system and a disk drive.

Another object of the present invention is to provide a disk drive control system wherein a host processor system can issue a data read/write command to a disk controller before a disk drive is brought into an access-enable state.

Still another object of the present invention is to provide a disk drive control system in which program execution efficiency of the host processor system is enhanced without causing an error in data read/write operation to a disk drive.

A disk drive control system according to the present invention is characterized in that a disk controller is supplied with a pseudo-ready signal, which is fixed at an active level, in place of a ready signal generated by a disk drive and that the disk controller is further supplied with an index pulse signal from the disk drive through a gate circuit which is opened by an inactive level of the ready signal from the disk drive and is closed by an active level of the ready signal.

Since the pseudo-ready signal is fixed at the active level, the disk controller informs a host processor system that the disk drive is in the access-enable state before the ready signal from the disk drive changes to the active level. In response thereto, the host processor system issues a data read/write command to the disk controller. Once the host processor system issues the data read/write command, it can perform operations other than the disk control. On the other hand, the disk controller responds to the data read/write command and searches a certain sector, from or into which data are to be read or written. Since the disk drive is not stabilized at this time, the disk controller may erroneously read data on the disk. However, the gate circuit is open at this time to prevent any index pulses from being supplied to the disk controller. Therefore, the disk controller continues to search the certain sector without informing the host processor system of, that an error occurred. When the disk drive is stabilized, the ready signal is changed to the active level to close the gate circuit. The index pulse signal can then be supplied to the disk controller. At this time, however, the data read out of the disk drive is also stabilized, so that the disk controller can search for a particular sector, if present, before it receives a predetermined number of index pulses.

Thus, the host processor system can perform other operations before the ready signal from the disk drive is changed to the active level without causing an error in operation.

BRIEF DESCRIPTION OF THE DRAWINGS

The above and other objects, advantages and features of the present invention will be more apparent from the following description taken in conjunction with the accompanying drawings.

DETAILED DESCRIPTION OF THE INVENTION

Figure 1:
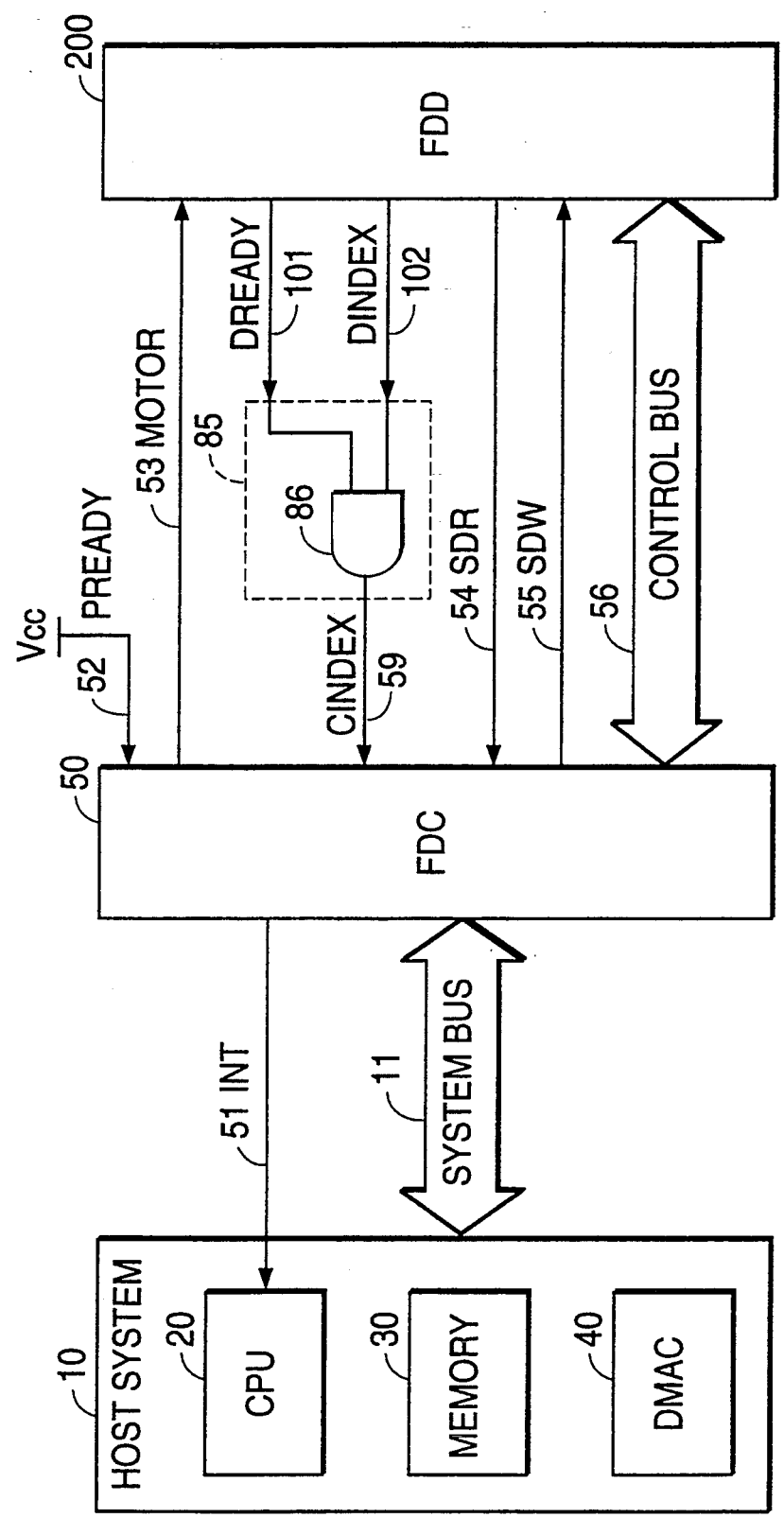
FIG. 1 is a block diagram representative of an embodiment according to the present invention.

Referring to FIG. 1, a floppy disk drive (FDD) 200 is used as a disk drive in a disk drive control system according to an embodiment of the present invention. A floppy disk controller (FDC) 50 intervenes between FDD 200 and a host processor system 10. This host processor system 10 includes a central processing unit (CPU) 20, a program/data semiconductor memory 30 and a direct memory access controller (DMAC) 40. A system bus 11 interconnects the host processor system 10 and FDC 50 to transmit commands, data and so forth therebetween. FDC 50 can issue an interrupt request to CPU 20 via INT line 51. FDC 50 is connected to FDD 200 via a serial data read (SDR) line 54 and a serial data write (SDW) line 55. Data to be written into FDD 200 are transferred to FDD 200 via SDW line 55 bit by bit. Data read out of FDD 200 are transferred to FDC 50 via SDR line 54 bit by bit. FDC 50 is connected to FDD 200 via a motor initiation (MOTOR) line 53. When FDC 50 changes MOTOR line 53 to an active level (the high level in this embodiment), FDD 200 is initiated, i.e., a spindle motor (not shown) in FDD 200 starts to rotate. When the rotation speed of the spindle motor is stabilized, i.e. when FDD 200 is brought into an access-enable state, FDD 200 changes DREADY signal line 101 from an inactive level (the low level in this embodiment) to an active level (i.e., the high level). FDD 200 further generates an index pulse on DINDEX signal line 102 each time a physical starting point of each track on a disk medium (not shown) is detected, as is well known in the art. In accordance with the present invention, DREADY signal 101 and DINDEX signal 102 are supplied to a gate circuit 85 composed of an AND gate 86 in this embodiment. The output of the AND gate 86 is supplied to FDC 50 as is CINDEX signal 59. Moreover, a pseudo-ready (PREADY) signal 52, which is fixed at the active level of DREADY signal 101 (i.e., the high level, Vcc), is supplied to FDC 50, in accordance with the present invention. While other control signals are required for data transmission between FDC 50 and FDD 200, they are not directly related to the present invention and are well known in the art. These other control signals are denoted by a control bus 56 in the drawing.

Figure 2:
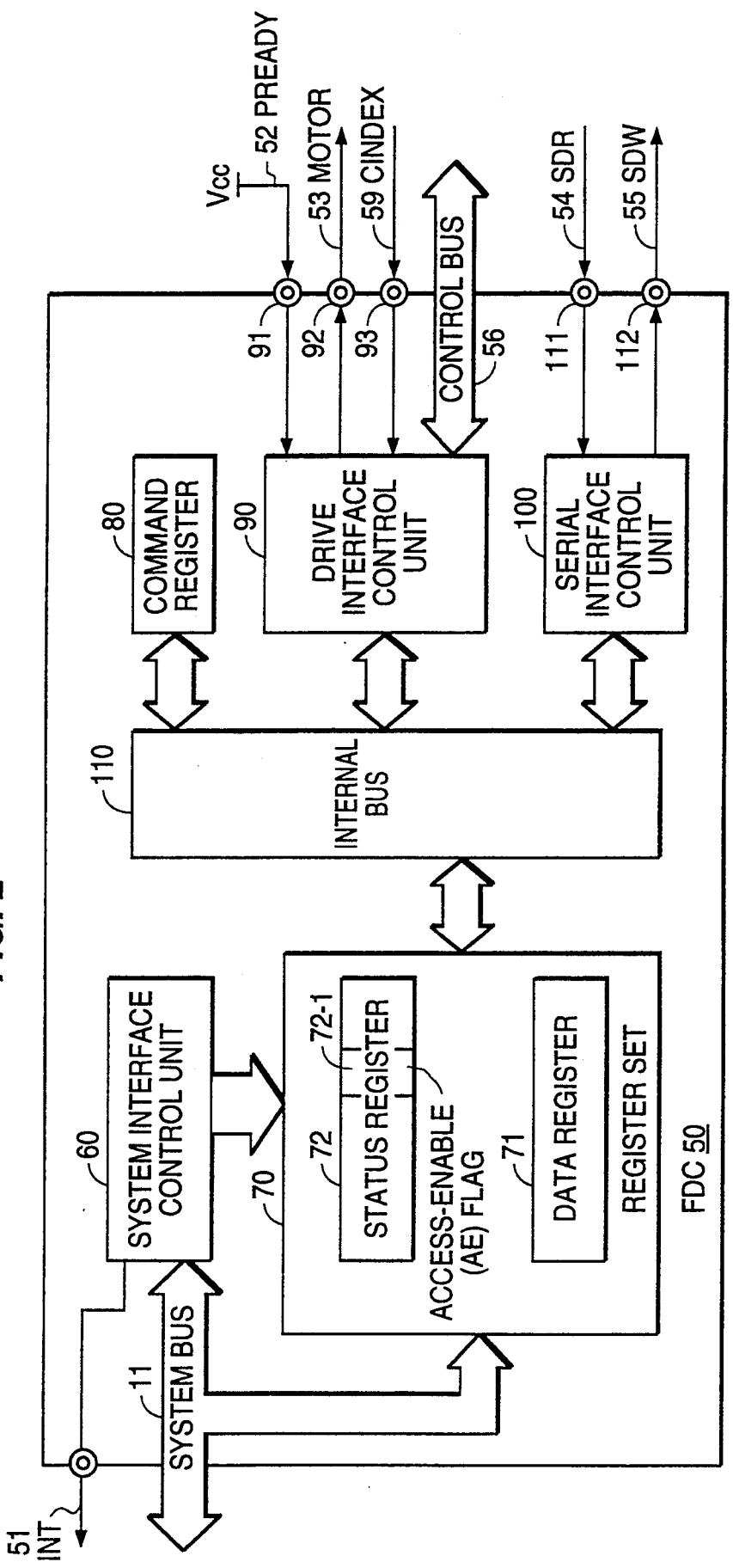
FIG. 2 is a internal block diagram representative of a disk controller (FDC) shown in FIG. 1.
Figure 3:
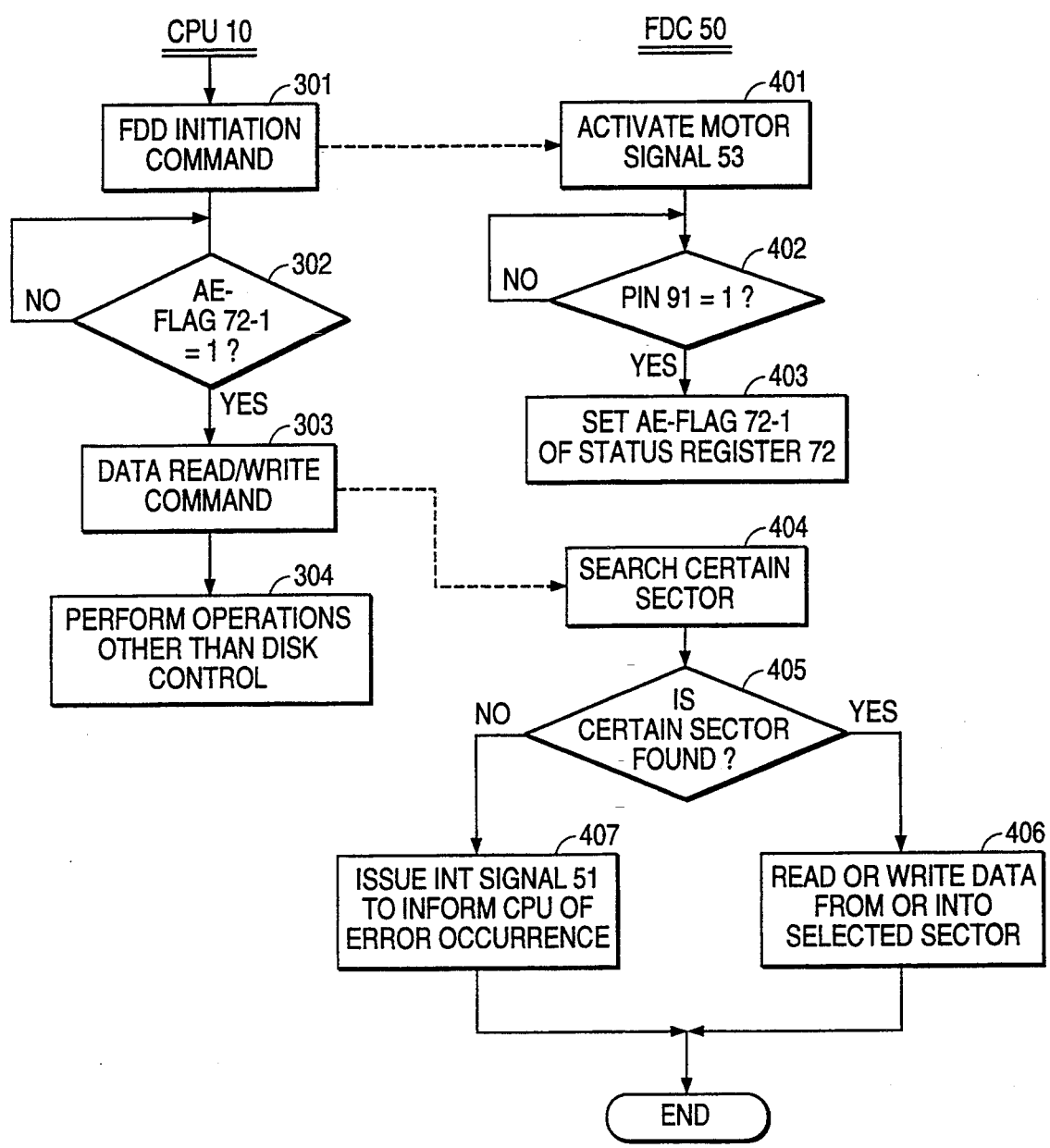
FIG. 3 is a flow chart representative of operations of a central processing unit (CPU) and FDC shown in FIG. 1.

Referring to FIG. 2, FDC 50 includes two control sections. The first section is a system interface control section for performing data transmission between FDC 50 and the host processor system 10. This section includes a system interface control unit 60, a register set 70 and a command register 80. The register set 70 includes a data register 71 and a status register 72 which has an access-enable (AE) flag 72-1. The second section is a disk drive interface control section for performing data transmission between FDC 50 and FDD 200. This section includes a drive interface control unit 90 and a serial interface control unit 100. In particular, the unit 90 has terminal pins 91 and 93 which are in turn supplied with PREADY signal 52 and CINDEX signal 59, respectively. MOTOR signal 53 is generated at a terminal pin 92. The unit 100 has terminal pins 111 and 112 which are connected to SDR and SDW lines 54 and 55, respectively. The units 90 and 100 and registers 70 and 80 are interconnected via an internal bus 110. Since the internal construction of FDC 50 is well known in the art, further description thereof will be omitted.

Figure 4:
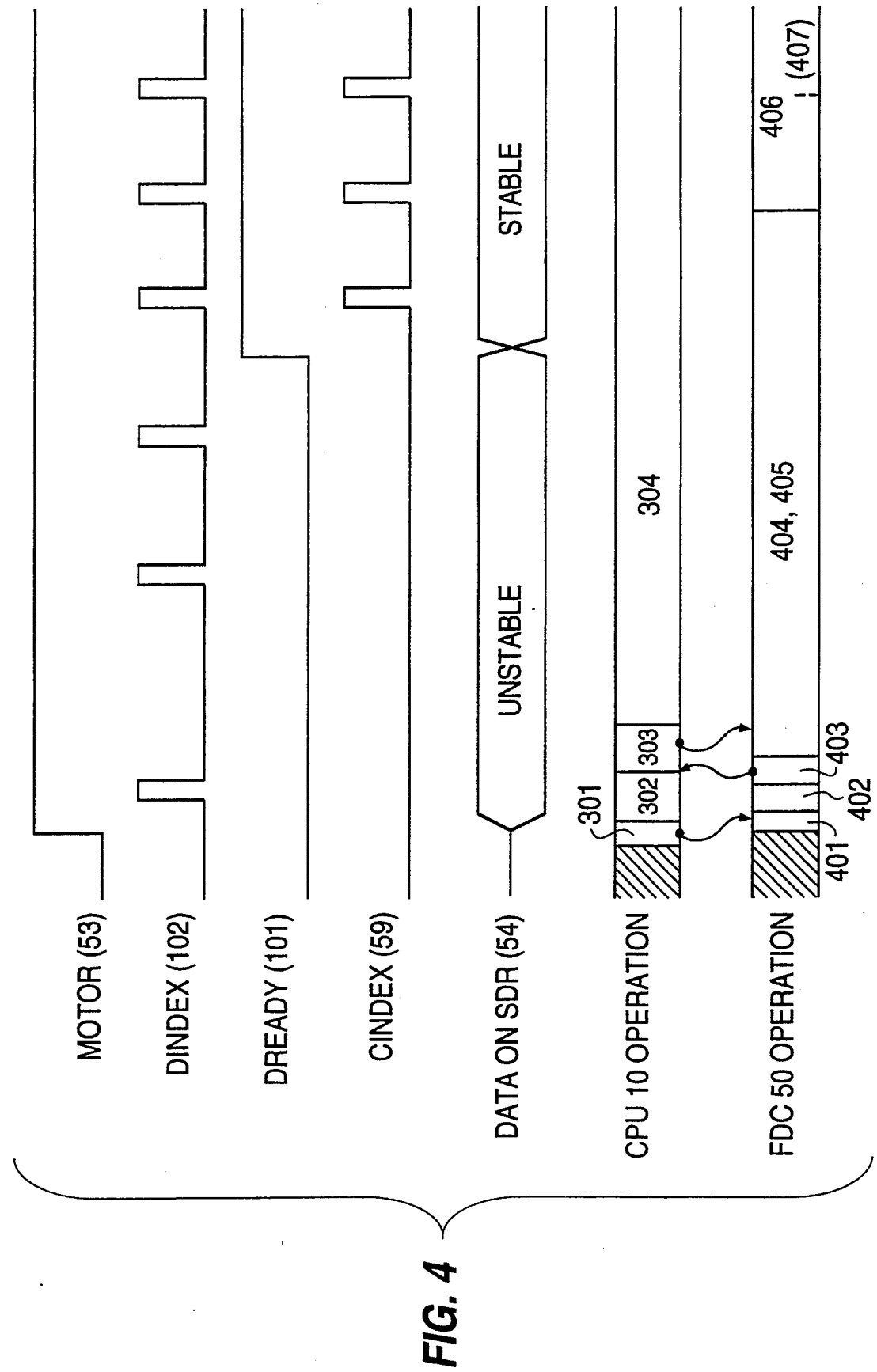
FIG. 4 is a timing chart of respective signals supplied to and generated from FDC shown in FIG. 1.

Next, an operation will be described below with reference to FIGS. 1 to 4. In the state where data read/write operation is not required to FDD 200, FDD 200 is deactivated with the spindle motor therein not being rotated. Power consumed by FDD 200 is thereby reduced. When the host processor system encounters data read/write request to FDD 200, it issues first a FDD initiation command to FDC 50 via the system bus 11, as shown by step 301 in FIGS. 3 and 4. This command is transferred to the unit 90 via the data register 71 and internal bus 110, so that the unit 90 activates MOTOR signal 53 (step 401 in FIG. 3). The signal 53 is thereby changed to the high level, as shown in FIG. 4. Thus, the spindle motor of FDD 200 starts to rotate. Thereafter, the unit 90 detects the level of the terminal pin 91 (step 402 in FIG. 3). As described above, the pin 91 is supplied with PREADY signal fixed at the high level in accordance with the present invention. Accordingly, the unit 90 immediately sets AE flag 72-1 in the status register 72 (step 403 in FIG. 3). On the other hand, after the host processor system 10 issues the FDD initiation command, it issues a FDD status check command to detect the state of the AE flag 72-1 (step 302 in FIG. 3). Since the AE flag 72-1 is set immediately, the operation step of the host processor system 10 is also shifted immediately to step 303. In step 303, the host processor system 10 issues a data read/write command to FDC 50. After this step is executed, the host processor system 10 is shifted to perform operations other than the disk control (step 304 in FIGS. 3 and 4). Thus, host processor system 10 can perform other program execution before FDD 200 is stabilized.

In response to the issued data read/write command, FDC 50 starts to search a certain sector on the disk medium of FDD 200, from which data is to be read or into which data is to be written, on the basis of data transferred via SDR line 54 or SDW line 55. At this time, however, since the rotation speed of spindle motor in FDD 200 is not stabilized, the data on SDR line 54 (SDW line 55) is supplied to FDC 50 in an unstable manner, as shown in FIG. 4. Accordingly, FDC 50 can hardly search that particular sector. On the other hand, FDD 200 generates an index pulse on DINDEX line 102 each time the physical starting point of each track on the disk medium is detected, as shown in FIG. 4. However, the AND gate 86 is open by the inactive level of the ready signal on DREADY line 101. No pulse thereby appears on CINDEX line 59. Accordingly, FDC 50 continues to search the certain sector, as shown in FIG. 4. When the spindle motor is stabilized to bring FDD 200 into the access-enable state, FDD 200 changes the ready signal on DREADY line 101 to the high level. The AND gate 86 is thereby closed transmitting the index pulse to FDC 50 via CINDEX line 59, as shown in FIG. 4. At this time, however, the data on SDR line 54 are supplied to FDC 50 in a stable manner. That is, FDC 50 performs the sector searching operation on the basis of stably supplied data. When FDC 50 searches for a particular before a predetermined number of index pulses (three index pulses in this embodiment) are supplied thereto, it performs a data read/write operation on that sector (steps 405 and 406). On the other hand, if FDC 50 cannot search for a particular sector until three index pulses are supplied thereto, it issues the interrupt request via INT line 51 to the processor system 10 to inform CPU 20 of an error occurrence (steps 405 and 407).

As described above, the present invention provides a disk drive control system in which a processor system can shift to perform other operations before a disk drive is brought into an access-enable state without causing an error in operation.

The present invention is not limited to the above embodiment, but may be modified and changed without departing from the scope and spirit of the invention.

What is claimed is:

1. A disk drive control system in which a disk controller is connected between a host processor system and a disk drive in order to control data transmission to or from a portion of a disk, said disk drive producing a ready signal and an index pulse signal, said ready signal taking an active level when said disk drive is in an access-enable state and an inactive level when said disk drive is not in an access-enable state and said index pulse signal being produced each time a starting point of a track is detected, said disk drive control system comprising:

means for supplying a pseudo-ready signal, held at said active level, to said disk controller irrespective of said ready signal produced by said disk drive, said disk controller responsive to said pseudo-ready signal to provide an indication to said host processor system that said disk drive is in said access-enable state, said host processor system being responsive to said indication, to issue a data read/write command to said disk controller, said disk controller responding to said data read/write command from said host processor system and initiating an operation for said data read/write command; and gate means supplied with said ready signal and said index pulse signal from said disk drive for transferring said index pulse signal to said disk controller in response to said active level of said ready signal, and said disk controller counting said index pulse signal transferred from said gate means and generating an error signal to said host processor system if said disk controller receives a predetermined number of index pulse signals before said portion of said disk is located by said disk drive controller.

2. The disk drive control system as claimed in claim 1, wherein said error signal comprises an interrupt request which is fed to said host processor system by said disk controller.

3. A disk drive control system for use in low power computing applications in which a disk drive is activated to rotate a disk when data is to be read from or written onto said disk, wherein said disk drive produces a ready signal and an index pulse signal, said ready signal having an active level when said disk drive is in an access-enable state and an inactive level when said disk drive is not in an access-enable state, said access-enable state being produced when said disk has attained a predetermined stabilized rotational speed, and said index pulse signal being produced each time a starting point of a track of said disk is detected;

a disk controller is connected between a central processing unit (CPU) and said disk drive in order to control data transmission to or from a portion of said disk; and said CPU is able to execute a data read or write command to said disk controller only when said CPU receives an indication that said disk is in an access-enable state, said disk drive control system comprising:

means for supplying a pseudo-ready signal, held at said active level, to said disk controller irrespective of said ready signal produced by said disk drive, said disk controller responsive to said pseudo-ready signal to indicate to said CPU that said disk is in said access-enable state even when said disk has not yet reached said predetermined stabilized rotational speed, thereby permitting said CPU to issue said data read or write command by transferring said command to said disk controller said disk controller responding to said data read or write command from said CPU and initiating an operation for said data read or write command; and gate means supplied with said ready signal and said index pulse signal from said disk drive for transferring said index pulse signal to said disk controller only in response to said active level of said ready signal, said disk controller counting said index pulse signal transferred from said gate means and generating an error signal to said CPU if a predetermined number of index pulse signals is received by said disk controller before said portion of said disk is located by said disk drive.

4. A method of transferring data between a host processor and a portion of a disk for use in low power computing applications in which a disk drive is activated to rotate a disk when data is to be read from or written onto said disk, wherein:

said disk drive produces a ready signal and an index pulse signal, said ready signal having an active level when said disk drive is in an access-enable state and an inactive level when said disk drive is not in an access-enable state, said access-enable state being produced when said disk has attained a predetermined stabilized rotational speed, and said index pulse signal being produced each time a starting point of a track of said disk is detected;

a disk controller is connected between said host processor and said disk drive in order to control data transmission to or from said portion of said disk; and said host processor is able to execute a data read or write command to said disk only when said host processor receives an indication that said disk is in an access-enable state, said method comprising the steps of:

supplying a pseudo-ready signal, held at said active level, to said disk controller irrespective of said ready signal produced by said disk drive, indicating to said host processor, in response to said disk controller receiving said pseudo-ready signal, that said disk is in said access-enable state even when said disk has not yet reached said predetermined stabilized rotational speed;

after said indicating step, transferring said data read or write command to said disk controller from said host processor thereby permitting said host processor to execute additional commands without waiting for said disk to reach said predetermined stabilized rotational speed;

transferring said index pulse signal to said disk controller only in response to said active level of said ready signal; and generating an error signal to said host processor if a predetermined number of index pulse signals is received by said disk controller before said portion of said disk is located by said disk drive.

5. A disk drive control system in which a disk controller is connected between a host processor system and a disk drive in order to control data transmission to or from a disk, said disk drive producing a ready signal and an index pulse signal, said ready signal having an active level when said disk drive is in an access-enable state and an inactive level when said disk drive is not in an access-enable state, and said index pulse signal being produced each time a starting point of a track is detected, said disk controller having first and second terminals and detecting a level at said first terminal to inform said host processor system of said access-enable state of said disk drive when said first terminal is detected to be at said active level, said disk or controller searching for a certain sector of said disk into which data are to be written or from which data are to be read, said disk controller receiving said index pulse signals at said second terminal and stopping searching when said certain sector is not found before a predetermined number of index pulse signals are received at said second terminal, said disk drive control system comprising:

means for supplying a pseudo-ready signal held at said active level, to said first terminal of said disk controller to hold said first terminal at said active level irrespective of said ready signal produced by said disk drive; and gate means supplied with said ready signal and said index pulse signal from said disk drive for transferring said index pulses signals to said second terminal of said disk controller in response to said active level of said ready signal.

6. The disk drive system as claimed in claim 5, wherein said disk controller issues an interrupt request to said host processor system when said disk controller does not locate said certain sector before said predetermined number of index pulse signals are transferred from said gate means and are received at said second terminal of said disk controller.

7. The disk drive system as claimed in claim 5, wherein said host processor system issues a data read/write command to said disk controller in response to said disk controller informing said host processor system of said access-enable state of said disk drive, said disk controller starting to search for said certain sector in response to said data read/write command.

8. The disk drive system as claimed in claim 5, wherein said disk controller activates said disk drive in response to a disk initiation command issued by said host processor system and thereafter detects the level at said first terminal.

9. An apparatus comprising:

a disk drive producing a ready signal and an index pulse signal, said ready signal having an active level when said disk drive is brought into an access-enable state and an inactive level when said disk drive is not in said access-enable state, said index pulse signal generated each time a starting point of a track is detected;

a disk controller including a first terminal, a second terminal, means for detecting a signal level at said first terminal to determine whether or not said disk drive is in said access-enable state., and means for performing a sector search operation to search for a certain sector into which data are to be written or from which data are to be read, said sector search operation being stopped when said certain sector is not found before a predetermined number of index pulse signals appear at said second terminal;

means coupled to said first terminal of said disk controller for supplying said first terminal with a pseudo-ready signal level such that said detecting means determines said disk drive to be in said access-enable state irrespective of the level of said ready signal produced by said disk drive; and gate means supplied with said ready signal and said index pulse signal from said disk drive for transferring said index pulse signal to said second terminal of said disk controller only when said ready signal is at said active level, wherein said gate means comprises an AND gate having a first input node supplied with said ready signal, a second input node supplied with said index pulse signal and an output node coupled to said second terminal of said disk controller.

* * * * *